Feb. 1, 1966    J. T. SULLIVAN    3,232,368
MOTOR TRUCK BODY STRUCTURE AND MOUNTING MEANS THEREFOR
Filed Oct. 14, 1963    3 Sheets-Sheet 1
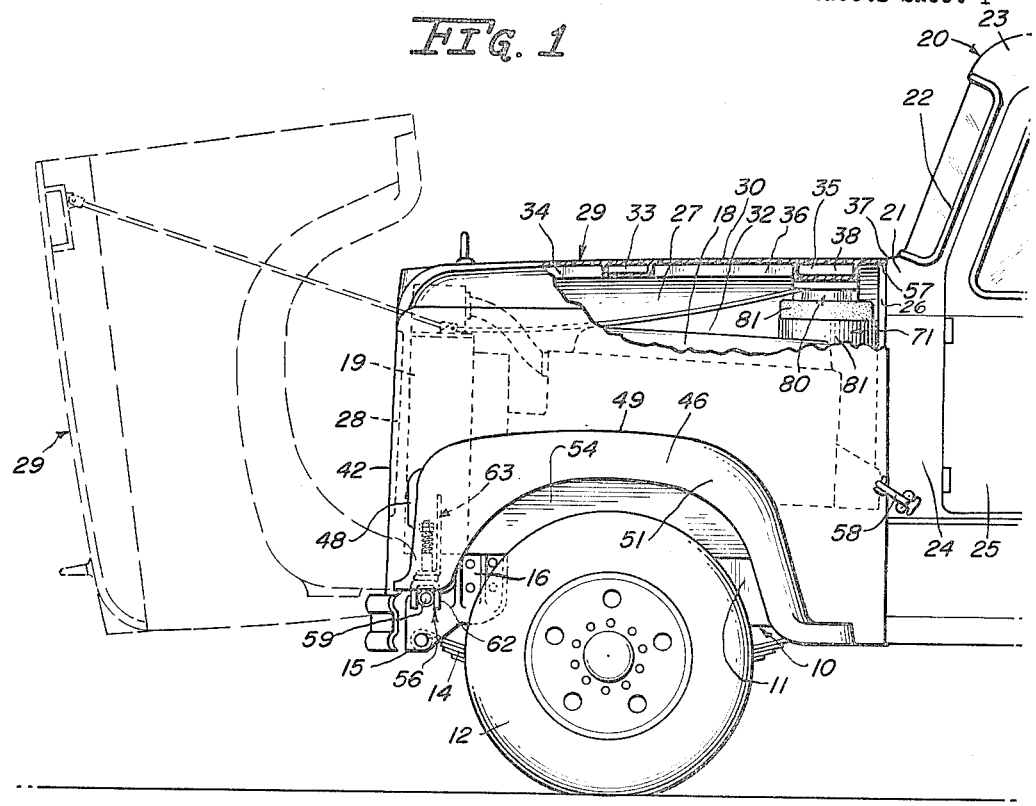
INVENTOR.
John T. Sullivan
Frederick Krube
Atty.

INVENTOR.
John T. Sullivan
Frederick J. Knubel
Atty.

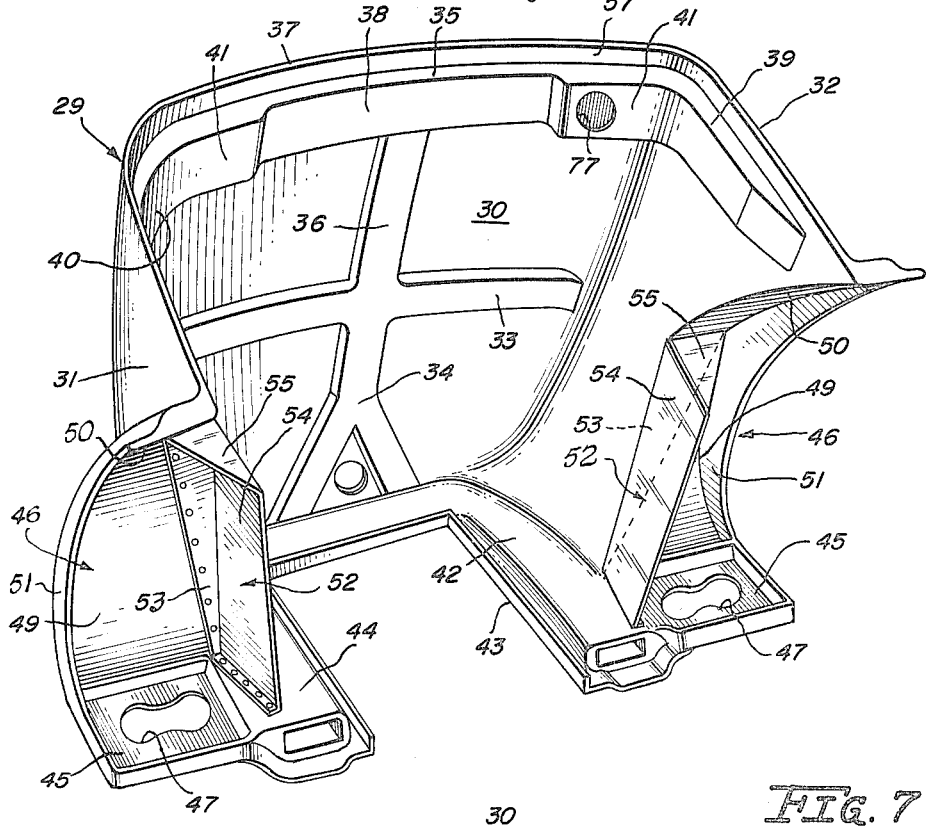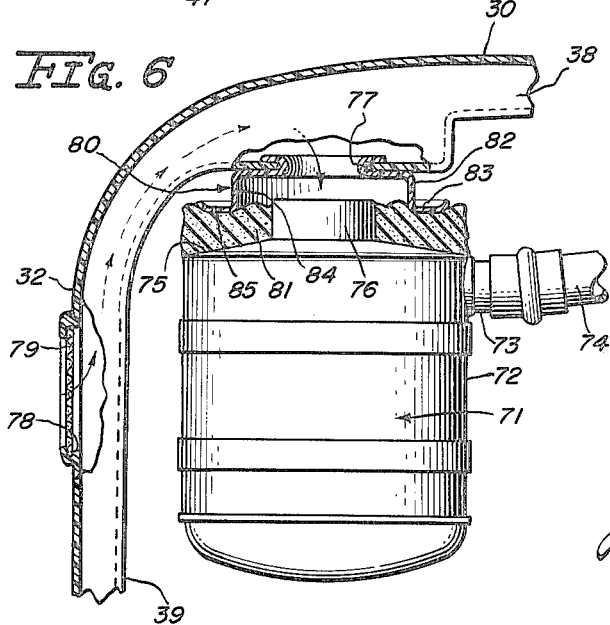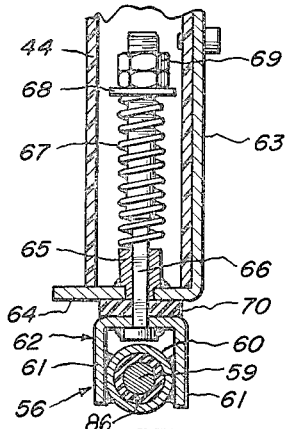

United States Patent Office 3,232,368
Patented Feb. 1, 1966

3,232,368
MOTOR TRUCK BODY STRUCTURE AND
MOUNTING MEANS THEREFOR
John T. Sullivan, Berkeley, Calif., assignor to International Harvester Company, Chicago, Ill., a corporation of New Jersey
Filed Oct. 14, 1963, Ser. No. 315,791
9 Claims. (Cl. 180—69)

This invention relates to motor truck body structure and mounting means therefor, and more particularly to a new improved unitary body structure for enclosing the engine, engine accessories and the ground engaging wheels adjacent to the engine, and novel means for supporting the unitary body structure on the chassis frame. The invention also contemplates a unitary body structure of the type set forth above having a portion of the engine air induction system incorporated therein.

The present day trend in motor vehicle design and construction is toward the development of vehicle bodies having a width considerably greater than those previously manufactured. While increasing the width of the vehicle body has tremendously improved the riding comfort of the vehicle occupants, it has also rendered accessibility to the engine and accessories for minor adjustments or major repairs difficult since it is necessary for the mechanic to bridge the vehicle fenders adjacent the engine with his body in order to work on the engine. Obviously, many of the engine parts and appurtenances cannot be conveniently reached when a mechanic is partially lying on the relatively wide fenders. This is especially true in the case of motor trucks where comparatively high fenders heretofore have been considered an immovable part of the body structure and entirely independent of the hood panel or covering for the engine which is movable to gain access to the engine. To overcome this difficulty, a unitary or pre-assembled superstructure is proposed which is constructed to provide wheel housings or fenders adjacent to each side of the engine, a hood panel and a radiator grille panel which unitary or pre-assembled structure is formed principally of relatively light weight, molded fiberglass-reinforced resin or similar material and which is capable of being easily tilted or pivoted forwardly from a normally lowered position to a raised position about a substantially horizontal transversely extending axis in order to gain access to the engine and other mechanisms of the vehicle normally enclosed by such superstructure. When the unitary hood, fenders and radiator grille panel structure is swung to its raised forwardly tilted position, the mechanic can assume a comfortable position between either of the wheels which the structure normally covers and the side of the engine adjacent thereto without the need of departing from present day styling practices.

As stated above, it is also proposed to form the unitary or pre-assembled hood, fender and radiator grille panel structure primarily out of light weight plastic such as molded fiberglass-reinforced resin material in order to reduce the weight of the entire structure, as well as to impart rust-proof properties and sound-deadening qualities thereto.

It is a further object of the invention to reinforce the unitary or pre-assembled hood, fender, and grille panel structure with ribs which are novelly disposed and have box-like sections, whereby the structure has great structural strength imparted thereto but yet is somewhat flexible and capable of absorbing shocks and strains without being permanently disformed or broken and where one of the reinforcing ribs is constructed and disposed in such a manner and is cooperable with the engine air cleaner so as to serve as a fresh air intake duct for the engine as well as a reinforcing rib for the unitary body structure.

Heretofore, it has generally been the practice of manufacturers of trucks or other vehicles designed for carrying loads over an uneven terrain or road surface irregularities to mount the front end superstructure such as the hood, fenders and radiator grille panel directly on the chassis frame in such a manner that the forces or shocks to which the frame is subjected are directly and fully transmitted to such front end superstructure with the result that deformation and ultimate breakage of the superstructure parts oftentimes occurred. Heretofore in vehicles provided with a forwardly tiltable unitary fender, hood and grille panel structure, it has been the practice to pivotally secure the forward end of such structure directly on the chassis frame in a relatively rigid manner and to provide releasable latch means for detachably connecting the free or rearwardmost edge of the unitary structure to the operator's compartment or cab. As a result the resiliently mounted vehicle cab was permitted to twist and bend with respect to the front end structure, when the chassis frame was subjected to torsional forces, but the unitary front end structure per se, which usually had its forward end rigidly connected to the chassis frame and its rearward end connected to the resiliently mounted vehicle cab when in its normally lowered position, could not accommodate the strains imposed thereon and was fatigued and oftentimes ultimately broken. The front pivotal connection means for attaching the unitary structure to the frame also were unduly stressed and strained.

It is, therefore, another object of the present invention to provide novel means for supporting a unitary molded fiberglass-reinforced resin hood, fender and radiator grille panel structure on a chassis frame whereby the unitary hood, fender and grille panel structure is capable of moving with respect to the frame and vehicle cab in a controlled manner in order to mitigate the transmission of forces, shocks and vibrations thereto when in its normally lowered position where it forms an enclosure for the engine and the adjacent ground-engaging wheels, but which is capable of being swung to a raised forwardly tilted position to gain complete access to the engine and engine appurtenances readily.

A still further object is to provide novel fresh air supply means for a motor truck engine which does not mar the attractiveness of the motor truck cab and front end body structure.

The foregoing and other important objects and other desirable features inherent in and encompassed by the invention, together with many of th e purposes and uses thereof, will be readily apparent from a reading of the ensuing description in conjunction with the annexed drawings, in which:

FIGURE 1 is a side elevational view of the forward end of a motor truck embodying the invention; the unitary hood, fender and radiator grille structure is shown in its normally lowered position and certain parts thereof are broken away to better illustrate the invention; the unitary hood, fender and radiator grille structure is illustrated in its forwardly raised or tilted position by broken lines;

FIGURE 4 is an enlarged detailed perspective view of one of the pivotal connecting means for attaching the unitary hood, fender and radiator grille panel structure to the chassis frame;

FIGURE 5 is a perspective view of the underside of the unitary hood, fender and radiator grille structure;

FIGURE 6 is a sectional view taken substantially along line 6—6 of FIGURE 3; and FIGURE 7 is a vertical sectional view taken substantially along line 7—7 of FIGURE 4.

Figure 3:
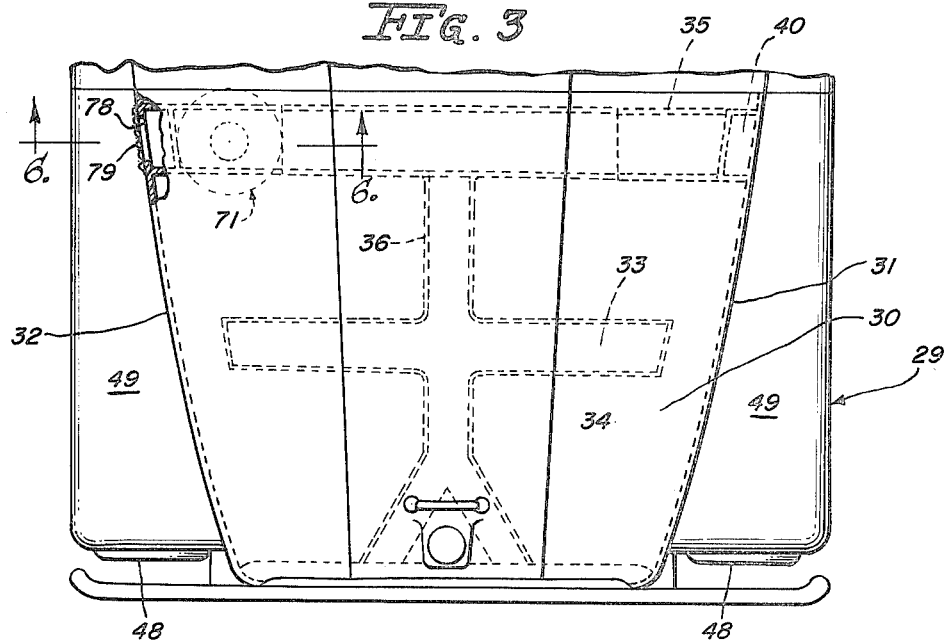
FIGURE 3 is a plan view of the motor truck shown in FIGURES 1 and 2.

Referring to the drawings in detail, wherein like reference characters represent like elements throughout the various views, the forward portion of a motor truck chassis 10 includes a pair of longitudinally extending side sill members 11. A pair of steerable ground-engaging wheels 12 are journaled on the ends of a transversely extending axle 13 in a conventional manner. The axle 13, in turn, is resiliently suspended from the chassis frame 10 by a pair of leaf spring assemblies 14. Each leaf spring assembly 14 has its forwardmost end pivotally connected to a depending portion 15 of a respective spring bracket 16. As best illustrated in FIGURE 4, each spring bracket 16 is rigidly secured to the web 17 of a respective side sill member 11 at the forwardmost end thereof.

The vehicle power plant or internal combustion engine 18 is centrally mounted on the extreme forward end of the chasis frame 10. The engine 18 is shown somewhat diagrammatically since it forms no part of the present invention per se. The engine cooling liquid is circulated through an upright radiator core 19 supported on the chassis frame 10 and spaced forwardly of the engine 18.

Figure 2:
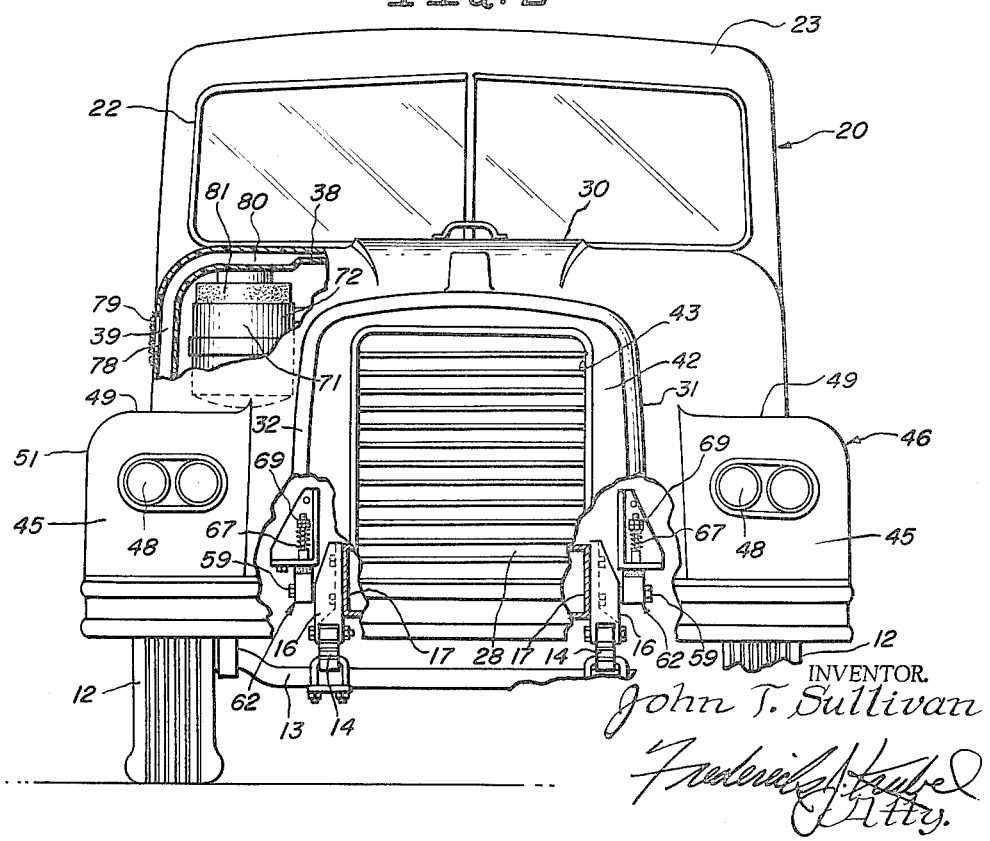
FIGURE 2 is a front elevational view of the motor truck shown in FIGURE 1 with certain parts thereof broken away to better illustrate the invention.

An operator's compartment, designated generally by numeral 20, is partially shown and is resiliently supported by the chassis frame 10 rearwardly of the engine 18 in a conventional manner. The operator's compartment 20 includes a cowl panel 21 having a windshield frame 22 integrally formed therewith. A roof 23 has a forward edge rigidly secured to the windshield frame 22 and has a rearward edge connected in a like manner to a back panel (not shown). Depending vertically from the transversely spaced ends of the cowl panel 21 are hinge pillar posts 24 which pivotally support the side doors 25. An inverted U-shaped cowl bar 26 is secured to the cowl panel 21. Suitably secured to the cowl bar is a dash panel or fire wall (not shown) which is disposed between the engine 18 and the interior of the operator's compartment 20. The dash panel serves as a rear wall of an engine compartment, designated generally by numeral 27, and a transversely extending radiator grille panel 28 defines the forward wall or limit of the engine compartment 27. The radiator grille panel 28 is normally spaced forwardly of the radiator core 19, as shown in FIGURES 1 and 2.

The unitary or pre-assembled body structure, designated generally by numeral 29, for enclosing the engine 18, radiator core 19, and other engine accessories, as well as the ground-engaging wheels 12, is molded principally of relatively light weight, fiberglass-reinforced resin and, consequently, is rust proof. As best shown in FIGURE 5, the unitary body structure 29 includes a panel having a generally inverted U-shaped cross-section with the bight portion serving as the top cover section 30 and the legs serving as side walls 31, 32 of the engine compartment 27. As illustrated in FIGURES 3 and 5, the underside of the panel of the unitary body structure 29 is strengthened and rigidified by means of a plurality of ribs 33, 34, and 35, all of which have generally box-like sections and are formed of fiberglass-reinforced plastic resin integrated by tape and plastic resin with the fiberglass-reinforced plastic resin of the top cover section 30 and side walls 31 and 32. The reinforcing rib 33 is spaced substantially midway between the longitudinal ends of the top cover section 30 and extends transversely from the side wall 31 to the side wall 32. The rib 34 is Y-shaped, as viewed in plan, with one leg 36 thereof extending longitudinally and spaced transversely midway between the side walls 31, 32 and intersecting the center rib 33. The rib 35, which is disposed adjacent the normally rearwardmost edge 37 of the unitary body structure 29, has a center section 38 which extends across the entire underside of the top cover section 30 and end sections 39 and 40 which are disposed on the inner surfaces of the side walls 31 and 32, respectively. It is to be understood that the end sections 39 and 40 are substantially vertically disposed when the unitary body structure 29 is in its normally lowered position, as illustrated in FIGURE 1 and have their lowermost ends closed, as best shown in FIGURE 5. From the foregoing, it will be apparent that the rib 35 in conjunction with the inverted U-shaped panel defines a hollow duct.

The end portions of the center section 38 of the rearwardmost rib 35 adjacent the side walls 31, 32 are formed to provide flattened wall portions 41 which are arranged to lie in a substantially horizontal plane when the unitary body structure 29 is in its engine enclosing position. The reason for forming and arranging the rearwardmost rib 35 in this manner will be pointed out hereinafter. The forwardmost wall 42 of the unitary body structure 29 is molded with a rectangular or generally inverted U-shaped opening 43 into which the louvered grille panel 28 is rigidly secured by any suitable means such as cooperable bolts and nuts, or the like. An inverted U-shaped hollow rib 44 having a box-like section partially encircles and reinforces the marginal edge of the grille panel opening 43. The outermost transverse end portions 45 of the forward wall 42 serve as the forwardmost walls of the wheel housings or fenders, designated generally by numeral 46, for the ground engaging wheels 12. The transversely spaced, forwardmost wall end portions 45 are each provided with an opening 47 for accommodating twin head lamps 48. From the foregoing, it will be appreciated that the construction and arrangement or disposition of the reinforcing ribs 33, 34, 35, and 44 imparts structural strength and rigidity to the unitary body structure 29 to prevent deformation and excessive flexing thereof without materially increasing the overall weight of the structure. Each fender 46 also includes a top wall 49, a rear wall portion 50, and a curved outer side wall 51 all of which are integrally formed together as well as with a respective side wall 31, 32.

As best shown in FIGURES 1 and 5, the unitary body structure 29 also includes a pair of sheet metal splash shields, designated generally by numeral 52. Each splash shield 52 is constructed and formed to provide a triangularly-shaped horizontally disposed top wall 53 which has its outermost edge extending longitudinally between the forward wall 42 and the rearwardmost rib 35 and is suitably attached to a respective side wall 31, 32. Each splash shield 52 also includes a side wall 54 which extends downwardly and inwardly from the innermost edge of the top wall 53 when the top wall is disposed substantially in a horizontal plane as when the unitary body structure 29 is in its normally lowered, engine-enclosing position, as shown in FIGURE 1. The lowermost edge of the side wall 54 of each splash shield 52 is adapted to be positioned closely adjacent a respective side sill member 11 when the unitary body structure 29 is in its normally lowered position, as illustrated in FIGURE 1. Each splash shield 52 further includes a back wall 55 which extends downwardly from the top wall 53 and outwardly from a respective side wall 31, 32. In effect, each back wall 55 functions as a transversely extending continuation of a respective rear wall portion 50 and together with such associated rear wall portion 50 defines the rearwardmost wall of a respective wheel housing or fender 46. It is to be understood that while each splash shield 52 is preferably constructed as a separate sheet metal component in order to simplify and reduce the cost of producing the unitary body structure 29, the splash shields 52 could also be made of fiberglass-reinforced plastic and molded integrally with the side walls 31, 32 of the unitary body structure 29 or separately fabricated of fiberglass-reinforced plastic and attached to the side walls 31, 32. When the unitary body structure 29 is in its normally lowered position, it will be appreciated that the splash shields 52 prevent dirt and other foreign materials thrown by the wheels 12 during operation of the vehicle from entering the engine compartment 27.

The unitary body structure 29, which is illustrated in its normally lowered, closed or engine-enclosing position in FIGURE 1, has its forwardmost end supported on the chassis frame 10 by means of a pair of hinge supports 56, whereby it may be swung about a transverse horizontal axis to an opened or raised position, shown in broken lines, for affording access to the engine 18 and the engine appurtenances as well as the ground-engaging wheels 12. In the lowered or closed position of the unitary body structure 29, the rearwardmost marginal edge portion 57 overlaps the cowl bar. Suitable weather stripping may be provided between the overlapping surfaces of the cowl bar 26 and the rearwardmost marginal edge 57 of the unitary body structure 29 to seal the joint between such surfaces when the unitary body structure 29 is in its normally lowered position. A pair of suitable manually operable latching mechanisms 58, one of which is shown somewhat diagrammatically in FIGURE 1, are provided for detachably securing the side wall 31, 32 to the adjacent hinge pillar posts 24 to releasably lock the unitary body structure 29 in its normally lowered position.

The hinge supports 56 for pivotally mounting the unitary body structure 29 for tilting movement with respect to the chassis frame 10 include a pair of pivot pins 59. Each pivot pin 59 is suitably secured to a respective front spring bracket 16 and extends transversely therefrom. It will be appreciated that the pivot pins 59 are in transverse alignment. Each pivot pin 59 is journaled in a cylindrical bearing 60 which is rigidly secured, as by welding or the like, to the legs 61 of a respective U-shaped member 62. A rubber insulator or bushing 86 may be interposed between each pivot pin 59 and its associated cylindrical bearing 60 to prevent metal-to-metal contact. As best shown in FIGURE 4, a fabricated, box-like bracket 63 is secured to the lowermost end of each leg of the inverted U-shaped hollow rib 44. The brackets 63 have flat portions 64 which are adapted to be substantially horizontally disposed when the unitary structure 29 is in its normal, lowered position. Each portion 64 has an opening therethrough in which one end of an elongated guide member 65 is disposed and rigidly fastened to the portion 64 encircling the opening. The guide members 65 are disposed within the hollow brackets 63 and each guide member has a bore extending therethrough which preferably has a square or rectangular cross section. Each U-shaped member 62 is provided with an elongated bolt 66; the head end of which is rigidly secured to the normally uppermost leg 61 of the U-shaped member 62. Each bolt 66 is adapted to extend through the bore of a respective guide member 65. The ends of the bolts 66 opposite the head ends are provided with screw threads and the shank sections intermediate the threaded and head ends of the bolts 66 disposed within the guide member 65 have a square or rectangular cross-section conforming to the bores of the guide members 65. A helically wound compression spring 67 encircles the threaded end of each bolt 66 and has one end abutting a respective guide member 65 and its opposite end bearing against a washer-like spring retainer 68 carried on the normally uppermost end of the bolt 66. A lock-nut 69 is utilized to maintain each bolt 66, spring 67, and bracket 63 operatively assembled. A cushion or pad 70 of non-metallic resilient material such as rubber is interposed between the upper surface of the normally uppermost leg 61 of a respective member 62 and the outer surface of the portion 64 of an associated bracket 63. From the foregoing, it will be appreciated that the coil springs 67 yieldably maintain the bracket portions 64 and the normally uppermost legs 61 of the U-shaped member 62 firmly in abutting engagement with the pads 70 which are sandwiched therebetween. However, because of the construction of the hinged supports 56, the front end of the unitary body structure 29 is capable of moving vertically with respect to the chassis frame 10 and the operator's compartment 20 against the resilient action of the springs 67 in a controlled manner. Thus, the transmission of forces, shocks and vibrations to the unitary body structure 29 is mitigated by permitting controlled relative movement between the chassis frame 10 and the unitary body structure 29.

It will also be appreciated that the hinged supports 56 permit the unitary hood, fender, and grille panel structure 29 to be swung about a transverse axis extending through the pivot pins 59 between a normally lowered position, shown in FIGURE 1, wherein it forms an enclosure for the engine 18 and a housing for the ground-engaging wheels 12, and a forwardly raised, tilted position, as shown by broken lines in FIGURE 1, to gain complete access to the engine 18 and engine appurtenances within the engine compartment or enclosure 27 as well as to the wheels 12. It is to be understood that suitable flexible cable means extending between and attached to the unitary body structure 29 and the structure for supporting the radiator core 19 is provided for limiting the extent the unitary body structure 29 is capable of pivoting forwardly with respect to the chassis frame 10.

As stated herein before, one of the objects of the invention is to utilize one of the hollow reinforcing ribs as a fresh air intake duct for the engine 18. The vehicle engine or power plant 18 is provided with an air cleaner 71 for filtering the air required by the engine for combustion. The air cleaner 71 utilized in conjunction with the engines 18 of the motor trucks to which the present invention relates generally has a substantially cylindrical outer casing 72 which is suitably supported within the engine compartment 27. The casing 72 has an outlet stub 73 to which is attached one end of a conduit 74 (partially shown in FIGURE 6). It is to be understood the opposite end of the conduit 74 is suitably attached to the engine 18 so as to provide the engine with clean filtered air. Extending vertically from the uppermost wall 75 of the air cleaner casing 72 is a centrally disposed air inlet stub 76. The air inlet stub 76 is generally cylindrical in form and the vertical axis thereof is substantially coincident with the axis of a circular opening 77 formed through one of the flattened wall portions 41 of the rearwardmost reinforcing rib 35. When the unitary body structure 29 is in its former lowered position as illustrated in FIGURES 1 and 6 an opening 78 is formed through the side wall 31 of the unitary body structure 29 in transverse alignment with the vertically disposed end section 39 of the reinforcing rib 35. Suitable screening 79 is fixed to the side wall 32 over the opening 78. From the foregoing it will be appreciated that air can enter the screened opening 78, flow through the duct defined by the rib 35 and the inverted U-shaped panel of the unitary body structure 29 to which it is secured and be admitted through the opening 77 provided in the flattened wall portion 41. As best shown in FIGURE 6, the uppermost edge of the air inlet stub 76 is vertically spaced from the flattened wall portion 41 provided with the opening 77 when the unitary body structure 29 is in its normally lowered position and consequently separable connecting means designated generally by numeral 80 are provided for closing and sealing the gap between the flattened wall portion 41 and the air inlet stub 76. The separable connecting means 80 include an annular ring 81 of sponge rubber or other material having like resilient characteristics. The ring 81 is disposed on the top wall 75 of the casing 72 and is suitably secured thereto by means of an adhesive or the like. The ring 81 encircles the air inlet stub 76 and when in its uncompressed state has a thickness substantially equal to the height of the air inlet stub 76. The separable connecting means 80 also includes an adapter member 82 which is suitably secured to the flattened wall portion 41 around the opening 77. The adapter member 82 is formed to provide an annular flange 83 having a substantially L-shape in vertical cross-section. One leg 84 of the flange 83 extends substantially normal to the flattened wall portion 41 and has a diameter considerably larger than the diameter of the air inlet stub 76. The annular leg portion of leg 85 of the L-shape flange 83 extends radially outwardly from the leg portion 84 and is spaced from the flattened wall portion 41 a distance greater than the distance between the flattened wall portion 41 and the uppermost surface of the sealing ring 81 when the unitary body structure 29 is in its normally lowered position and the sealing ring 81 is uncompressed. Consequently when the unitary body structure 29 is in its normally lowered position the leg portion 85 of the flange 83 is embedded in the resilient ring 81 as shown in FIGURE 6 to provide a substantially air tight seal between the opening 77 and the air inlet stub 76 of the air cleaner casing 72. It will also be appreciated that the connecting means 80 is automatically disconnected upon forward tilting or raising of the unitary body structure 29 and the disconnection of the connecting means 80 in no way interferes with the tilting operation of the unitary body structure 29. Furthermore, the novel means for supplying the engine 18 with fresh air described above simplifies the engine air induction problem and does not entail the use of inlet pipes and the like projecting or protruding from the unitary body structure 29 as is the common practice in prior motor truck body designs and structures to mar the neat, uncluttered appearance and overall attractiveness and esthetic appeal of the vehicle.

The embodiment of the invention chosen for the purposes of illustration and description herein is that preferred for achieving the objects of the invention and developing the utility thereof in the most desirable manner, due regard being had to existing factors of economy, simplicity of design and construction and the improvements sought to be effected. It will be appreciated therefore that the particular structural and functional aspects emphasized herein are not intended to exclude but rather to suggest other adaptations and modifications of the invention as fall within the spirit and scope of the invention as defined in the appended claims.

What is claimed is:

1. A motor vehicle having a chassis frame and an engine supported by said frame contiguous to the forward end thereof, the combination comprising, an air cleaner adjacent the engine and operatively connected thereto; an enclosure for said engine and air cleaner including a hood structure pivotally supported on said frame for swinging movement about a laterally extending, horizontal axis between a normal, lowered position wherein it overlies said engine and air cleaner and a forwardly tilted, raised position wherein said engine and air cleaner are exposed, said structure including a panel having a substantially inverted U-shaped configuration, and a reinforcing rib secured to the underside of said inverted U-shaped panel, said rib having a generally laterally extending mid-section provided with an opening therethrough, said rib and panel forming a hollow air duct having one end opening exteriorly of said enclosure, said opening in said mid-section of said rib serving as an outlet opening for said air duct; and separable sealing means operably connecting said air duct and air cleaner to provide air communication therebetween through said air duct outlet opening whenever said hood structure is in its normal, lowered position, said sealing means being adapted to automatically operably disconnect and connect said air duct and air cleaner upon movement of said hood structure away and toward its normal, lowered position, respectively.

2. In a motor vehicle having a chassis frame and an engine supported by said frame contiguous to the forward end thereof, the combination comprising, an air cleaner adjacent the engine and operatively connected thereto; an enclosure for said engine and air cleaner including a hood structure pivotally supported on said frame for swinging movement about a laterally extending, horizontal axis between a normal, lowered position wherein it overlies said engine and air cleaner and a forwardly tilted, raised position wherein said engine and air cleaner are exposed, said structure including a plastic resin panel having a substantially inverted U-shaped configuration, and a plastic resin rib secured to the underside of said inverted U-shaped panel, said rib and panel forming a hollow air duct, said air duct having one end opening exteriorly of said enclosure and having a laterally extending mid-section, said mid-section of said air duct having an outlet opening interiorly of said enclosure when said hood structure is in its lowered position; and separable sealing means operatively connecting said air duct and air cleaner to provide air communication therebetween through said air duct outlet opening whenever said hood structure is in its normal lowered position, said separable sealing means being adapted to operatively disconnect said air duct and air cleaner concomitantly with movement of said hood structure away from its normal lowered position, said separable sealing means being adapted to operably connect said air duct and said air cleaner concomitantly with movement of said hood structure into its normal lowered position.

3. A motor vehicle having a chassis frame and an engine supported by said frame contiguous to the forward end thereof, the combination comprising, an air cleaner adjacent the engine and operatively connected thereto; an enclosure for said engine and air cleaner including a hood structure pivotally supported on said frame for swinging movement about a laterally extending, horizontal axis between a normal, lowered position wherein it overlies said engine and air cleaner and a forwardly tilted, raised position wherein said engine and air cleaner are exposed, said structure including a panel having a substantially inverted U-shaped configuration with the bight portion thereto being horizontally disposed and the leg portions thereof extending vertically downwardly from said bight portion when said hood structure is in its lowered position, said structure including a plurality of reinforcing ribs secured to the underside of said panel, one of said ribs having a mid-section secured to said bight portion of said panel and its end sections secured to respective leg portions of said panel, said one rib and panel forming a hollow air duct, one of said leg portions of said panel having an air inlet opening therethrough in registration with one end of said air duct, said opening providing air communication between said one end of said air duct and the exterior of said enclosure when said hood structure is in its lowered position, said one rib having an opening therethrough spaced from said air inlet opening, said rib opening serving as an air outlet opening for said air duct; and separable sealing means for operatively connecting said air duct and air cleaner to provide air communication between said air cleaner and said air duct through said air duct outlet opening whenever said hood structure is in its normal, lowered position, said separable sealing means being adapted to operatively disconnect said air duct and air cleaner concomitantly with swinging movement of said hood structure away from its normal, lowered position, said separable sealing means being adapted to operatively connect said air duct and air cleaner concomitantly with swinging movement of said hood structure into its normal, lowered position.

4. In a motor vehicle having a chassis frame, an engine supported by said frame contiguous to the forward end thereof, upright radiator means supported by said frame forwardly of the engine, and a pair of ground-engaging wheels spaced adjacent to respective opposite sides of said engine supporting said frame, the combination comprising, an air cleaner adjacent said engine and operatively connected thereto; a preassembled hood, fender and radiator grille structure pivotally supported on said chassis frame for swinging movement about a laterally extending, horizontal axis between a normal, lowered position wherein it overlies said wheels, engine and air cleaner and a portion thereof is longitudinally spaced from and substantially parallel to said radiator means and a forwardly tilted, raised position wherein said wheels, engine, air cleaner and radiator means are exposed, said structure including a panel having a substantially inverted U-shaped configuration, and a reinforcing rib secured to the under side of said inverted U-shaped panel, said rib and panel forming a hollow air duct, said panel having an air inlet opening therethrough in registration with one end of said air duct, said opening providing air communication between said one end of said air duct and the exterior of said preassembled hood, fender and radiator grille structure, said rib having an opening therethrough spaced from said air inlet opening, said rib opening serving as an air outlet opening for said air duct; and separable sealing means for operatively connecting said air duct and air cleaner to provide air communication between said air cleaner and said air duct through said air outlet opening whenever said pre-assembled hood, fender and radiator grille structure is in its normal, lowered position, said separable sealing means being adapted to operatively disconnect said air duct and air cleaner concomitantly with movement of said pre-assembled hood, fender and radiator grille structure away from its normal, lowered position, said separable sealing means being adapted to operatively connect said air duct and air cleaner concomitantly with movement of said pre-assembled hood, fender and radiator grille structure into its normal, lowered position.

5. A motor vehicle having a chassis frame and an engine supported by said frame contiguous to the forward end thereof, the combination comprising, an air cleaner adjacent the rearwardmost end of the engine and operatively connected thereto; an enclosure for said engine and air cleaner including a hood structure pivotally supported on said frame for swinging movement about a laterally extending, horizontal axis between a normal, lowered position wherein it overlies said engine and air cleaner and a forwardly tilted, raised position wherein said engine and air cleaner are exposed, said structure including a panel having a substantially inverted U-shaped configuration with the bight portion thereof being horizontally disposed and the leg portions thereof extending vertically downwardly from said bight portion when said structure is in its lowered position, said structure including a plurality of reinforcing ribs secured to the underside of said panel, one of said ribs having a laterally extending midsection secured to said bight portion of said panel adjacent its rearwardmost edge and its end sections secured to respective leg portions of said panel, said laterally extending rib and panel forming a hollow air duct, one of said leg portions of said panel having an air inlet opening therethrough in registration with one end of said air duct, said opening providing air communication between said one end of said air duct and the exterior of said enclosure when said hood structure is in its lowered position, said midsection of said laterally extending rib having an opening therethrough spaced from said air inlet opening, said rib opening serving as an air outlet opening for said air duct; and separable sealing means for operably connecting said air duct and air cleaner to provide air communication between said air cleaner and said air duct through said air duct outlet opening whenever said hood structure is in its normal, lowered position, said separable sealing means being adapted to operably disconnect said air duct and air cleaner concomitantly with movement of said hood structure away from its normal, lowered position, said separable sealing means being adapted to operably connect said air duct and air cleaner concomitantly with movement of said hood structure into its normal, lowered position.

6. In a motor vehicle having a chassis frame provided with a pair of laterally spaced spring brackets at the forward end thereof, an engine supported by said frame contiguous to the forward end thereof and laterally spaced between said spring brackets, a pair of ground-engaging wheels spaced adjacent to respective opposite sides of said frame, and a pair of leaf spring means, each of said leaf spring means having one end attached to a respective spring bracket and operatively connected to a respective ground-engaging wheel, the combination comprising, an air cleaner adjacent said engine and operatively connected thereto; a pre-assembled hood and fender structure, said structure including a panel having a substantially inverted U-shaped configuration, and a reinforcing rib secured to the underside of said inverted U-shaped panel, said rib having a generally laterally extending mid-section, said rib and panel forming a hollow air duct, said panel having an air inlet opening therethrough in registration with one end of said air duct, said opening providing air communication between said one end of said air duct and the exterior of said pre-assembled hood and fender structure, said mid-section of said rib having an opening therethrough laterally spaced from said air inlet opening, said rib opening serving as an air outlet opening for said air duct; means for pivotally supporting said pre-assembled hood and fender structure on said chassis frame for swinging movement about a laterally extending, horizontal axis between a normal, lowered position wherein it overlies said wheels, engine and air cleaner and a forwardly tilted, raised position wherein said wheels, engine and air cleaner are exposed, said means including a laterally extending pivot pin carried by each of said spring brackets and a cooperable bearing element carried by said pre-assembled hood and fender structure; and separable sealing means for operatively connecting said air duct and air cleaner to provide air communication between said air cleaner and said air duct through said air outlet opening whenever said pre-assembled hood and fender structure is in its normal, lowered position, said separable sealing means being adapted to operatively disconnect said air duct and air cleaner concomitantly with movement of said pre-assembled hood and fender structure away from its normal, lowered position, said separable sealing means being adapted to operatively connect said air duct and air cleaner concomitantly with movement of said pre-assembled hood and fender structure into its normal, lowered position.

7. A motor vehicle having a chassis frame and an engine supported by said frame contiguous to the forward end thereof, the combination comprising, an air cleaner adjacent the engine, said air cleaner having a housing provided with an outlet operatively connected to said engine and an upwardly opening inlet; an enclosure for said engine and air cleaner including a hood structure pivotally supported on said frame for swinging movement about a laterally extending, horizontal axis between a normal, lowered position wherein it overlies said engine and air cleaner and a forwardly tilted, raised position wherein said engine and air cleaner are exposed, said structure including a panel having a substantially inverted U-shaped configuration with the bight portion thereof being horizontally disposed and the leg portions thereof extending vertically downwardly from said bight portion when said hood structure is in its lowered position, one of said leg portions of said panel having an air inlet opening therethrough, said structure including an elongated, laterally extending reinforcing rib secured to the underside of said panel, said rib having a substantially U-shape in sections perpendicular to the longitudinal axis of the rib, said laterally extending rib having a mid-section secured to said bight portion of said panel and its end sections secured to respective leg portions of said panel, one of said end sections underlying said air inlet opening, said mid-section having an air outlet opening therein vertically spaced from and in vertical alignment with said air cleaner inlet when said hood structure is in its normal, lowered position, said laterally extending rib and panel forming a hollow air duct, and separable sealing means for operatively connecting said air duct and air cleaner to provide air communication between said air cleaner and said air duct through said air duct outlet opening and said air cleaner inlet whenever said hood structure is in its normal, lowered position, said separable sealing means being adapted to operatively disconnect said air duct and air cleaner concomitantly with pivotal movement of said hood structure away from its normal, lowered position, said separable sealing means being adapted to operatively connect said air duct and air cleaner concomitantly with pivotal movement of said hood structure into its normal, lowered position.

8. A motor vehicle having a chassis frame, an engine supported by said frame contiguous to the forward end thereof, and a pair of ground-engaging wheels spaced adjacent to respective opposite sides of said engines supporting said frame, the combination comprising, an air cleaner adjacent said engine, said air cleaner including a casing provided with an outlet operatively connected to said engine and an upwardly opening, generally vertically extending cylindrical inlet stub; a pre-assembled, unitary hood and fender structure pivotally supported on said chassis frame for swinging movement about a laterally extending, horizontal axis between a normal, lowered position wherein it overlies said wheels and encloses said engine and air cleaner and a forwardly tilted, raised position wherein said wheels, engine and air cleaner are exposed, said structure including a panel having a substantially inverted U-shaped configuration with the bight portion thereof being horizontally disposed and the leg portions thereof extending vertically downwardly from said bight portion when said hood fender structure is in its lowered position, one of said leg portions having an opening therethrough, and a reinforcing rib secured to the underside of said panel, said rib having a mid-section secured to said bight portion of said panel and its ends secured to respective leg portions of said panel, said rib and panel forming a hollow air duct, one of said end sections of said rib underlying said panel leg portion opening whereby air communication is provided between the said air duct and the exterior of said enclosure when said hood structure is in its lowered position, said rib mid-section having an opening therethrough vertically spaced from and aligned with said air cleaner inlet stub when said hood and fender structure is in its lowered position, said opening serving as an air duct outlet opening; and separable sealing means for operatively connecting said air duct and air cleaner to provide air communication between said air cleaner and said air duct through said air duct outlet opening and said air cleaner inlet stub whenever said hood fender structure is in its normal, lowered position, said sealing means including a ring of deformable, resilient material carried by said air cleaner casing and encircling said air cleaner inlet stub and a cylindrical member having one end fixed to said mid-section of said rib about said air duct outlet opening, said cylindrical member having a diameter greater than said inlet stub and the end thereof opposite the end fixed to said rib being embedded in said ring whenever said hood and fender structure is in its normal, lowered position, said cylindrical member and ring being adapted to move out of embedding engagement with each other to operatively disconnect said air duct and air cleaner concomitantly with swinging movement of said hood and fender structure away from its normal, lowered position, said cylindrical member and ring moving into embedding engagement with each other to operatively connect said air duct and air cleaner concomitantly with swinging movement of said hood and fender structure into its normal, lowered position.

9. In a motor vehicle having a chassis frame provided with a pair of laterally spaced spring brackets at the forward end thereof, an engine supported by said frame contiguous to the forward end thereof and laterally spaced between said spring brackets, a pair of ground-engaging wheels spaced adjacent to respective opposite sides of said frame, and a pair of leaf spring means, each of said leaf spring means being operatively connected to a respective ground-engaging wheel and having one end attached to a respective spring bracket, the combination comprising, an air cleaner adjacent said engine and operatively connected thereto; a preassembled, unitary structure, said structure serving as an enclosure for said engine and air cleaner and as wheel housings for said ground-engaging wheels, said unitary structure including a panel having a substantially inverted U-shaped configuration with the bight portion thereof being horizontally disposed and the leg portions thereof extending vertically downwardly from said bight portion when said unitary structure is in its lowered position, said panel further having a forwardmost wall portion provided with a substantially inverted U-shaped opening therethrough, said unitary structure including a pair of reinforcing ribs, one of said ribs having a laterally extending mid-section secured to the underside of said bight portion of said panel adjacent its rearwardmost edge and its end sections secured to respective leg portions of said panel, said laterally extending rib and panel forming a hollow air duct, one of said leg portions of said panel having an air inlet opening therethrough in registration with one end of said air duct, said opening providing air communication between said one end of said air duct and the exterior of said unitary structure when said unitary structure is in its lowered position, said mid-section of said laterally extending rib having an opening therethrough spaced from said air inlet opening, said rib opening serving as an air outlet opening for said air duct, the other of said pair of reinforcing ribs having a substantially inverted U-shaped configuration, said other of said pair of reinforcing ribs being secured to said forwardmost wall portion of said panel, and outlining said opening in said forwardmost wall portion of said panel; pivot connecting means for pivotally supporting said unitary structure on said chassis frame for swinging movement about a laterally extending, horizontal axis between a normal, lowered position wherein it houses said wheels and encloses said engine and air cleaner and a forwardly tilted, raised position wherein said wheels, engine and air cleaner are exposed, said pivot connecting means including a laterally extending pivot pin carried by each of said spring brackets, a pair of cylindrical bearing elements, each of said bearing elements rotatably receiving a respective pivot pin, a box-like bracket secured to the lowermost end of each leg portion of said inverted U-shaped reinforcing rib, each of said brackets having a flat surface disposed substantially horizontal when said unitary structure is in its normal, lowered position, and means for operatively connecting each of said cylindrical bearing elements to a respective bracket, said means including resilient means yieldably urging each of said bearing elements toward a respective flat bracket surface and separable sealing means for operatively connecting said air duct and air cleaner to provide air communication between said air cleaner and said air duct through said air outlet opening whenever said unitary structure is in its normal, lowered position, said separable sealing means being adapted to operatively disconnect said air duct and air cleaner concomitantly with movement of said unitary structure away from its normal, lowered position, said separable sealing means being adapted to operatively connect said air duct and air cleaner concomitantly with movement of said unitary structure into its normal, lowered position.

References Cited by the Examiner

UNITED STATES PATENTS

| | | | |
|---|---|---|---|
| 1,855,038 | 4/1932 | Walker | 180—54 |
| 2,447,397 | 8/1948 | Craig | 180—69 |
| 3,017,944 | 1/1962 | Norrie | 180—69 |

FOREIGN PATENTS

| | | |
|---|---|---|
| 178,553 | 5/1954 | Austria. |
| 670,274 | 4/1952 | Great Britain. |
| 791,888 | 3/1958 | Great Britain. |

BENJAMIN HERSH, *Primary Examiner.*

A. HARRY LEVY, *Examiner.*